United States Patent
Katahira et al.

(10) Patent No.: US 7,733,348 B2
(45) Date of Patent: Jun. 8, 2010

(54) IMAGE PROCESSING APPARATUS, ITS CONTROL METHOD AND DATA MANAGEMENT METHOD

(75) Inventors: Yoshiaki Katahira, Yokohama (JP); Fumio Shoji, Komae (JP); Takao Ikuno, Yokohama (JP); Masahiro Odaira, Kawasaki (JP); Toru Fujino, Kawaguchi (JP); Kenji Kasuya, Yokohama (JP); Noritsugu Okayama, Kawasaki (JP); Yasuhito Niikura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 11/629,787

(22) PCT Filed: Jun. 14, 2005

(86) PCT No.: PCT/JP2005/011222

§ 371 (c)(1),
(2), (4) Date: May 17, 2007

(87) PCT Pub. No.: WO2005/124680

PCT Pub. Date: Dec. 29, 2005

(65) Prior Publication Data

US 2007/0279425 A1    Dec. 6, 2007

(30) Foreign Application Priority Data

Jun. 15, 2004    (JP) .............................. 2004-177495

(51) Int. Cl.
*G06F 12/02* (2006.01)
(52) U.S. Cl. .................. 345/543; 345/544; 711/170; 711/171; 711/172; 711/173
(58) Field of Classification Search .................. 345/543; 711/170
See application file for complete search history.

(56) References Cited

U.S. PATENT DOCUMENTS 5,375,233 A * 12/1994 Kimber et al. ..................... 1/1

(Continued)

FOREIGN PATENT DOCUMENTS

JP    05-270093    10/1993

(Continued)

*Primary Examiner*—Xiao M Wu
*Assistant Examiner*—Scott E Sonners
(74) *Attorney, Agent, or Firm*—Fitzpatrick, Cella Harper & Scinto (57) ABSTRACT

The present invention provides an image processing apparatus that can make effective use of a memory area. To accomplish this, the image processing apparatus comprises storage means having a first management record storage area for storing a first management record used for management of image data and a second management record storage area for storing a second management record linked with the first management record, and acquisition means for acquiring an area for storing the first management record and the second management record in the storage means, the apparatus managing the image data using the first management record and the second management record in the storage means, the apparatus managing the image data using the first management record and the second management record, wherein the acquisition means acquires a storing area for storing the first management record in the second management record storage area, when the storing area for storing the first management record is not acquired in the first management record storage area.

11 Claims, 10 Drawing Sheets

U.S. PATENT DOCUMENTS

| | | | |
|---|---|---|---|
| 5,587,800 A | 12/1996 | Miyazaki | 358/296 |
| 6,643,754 B1 * | 11/2003 | Challenger et al. | 711/171 |
| 6,701,420 B1 * | 3/2004 | Hamilton et al. | 711/170 |

FOREIGN PATENT DOCUMENTS

| | | | |
|---|---|---|---|
| JP | 07-085083 | | 3/1995 |
| JP | 08-195889 | | 7/1996 |
| JP | 08195889 A | * | 7/1996 |
| JP | 2001-216192 | | 8/2001 |
| JP | 2001-238008 | | 8/2001 |
| JP | 2001238008 A | * | 8/2001 |
| JP | 2003-087538 | | 3/2003 |

* cited by examiner

IMAGE PROCESSING APPARATUS, ITS CONTROL METHOD AND DATA MANAGEMENT METHOD

TECHNICAL FIELD

The present invention relates to an apparatus and method for managing image data.

BACKGROUND ART

An image processing apparatus which can accumulate image data has been known since before. However, conventionally, the memory area for management record for use in a file system within the apparatus was prepared by fixed size for each kind (job management record, file management record, page management record and image block management record). And a job management record was stored only in the memory area for job management record, a file management record was stored only in the memory area for file management record, a page management record was stored only in the memory area for page management record, and an image block management record was stored only in the memory area for image block management record (Japanese Patent Application Laid-Open No. 2001-216192).

With the conventional image processing apparatus, if a storing area for any record could not be secured in the above memory area in storing the image data, the operation was ended with an error, even though there was room in other memory areas for management record. Therefore, it could work only by the number of jobs, the number of files, the number of pages and the image data accumulated block count that are decided in the device in advance. In other words, productivity was poor because the memory was not utilized effectively and memories had to be increased to prevent the error end.

DISCLOSURE OF INVENTION

The present invention provides an image processing apparatus that can make effective use of a memory area.

According to the present invention, the foregoing problem is solved by providing an image processing apparatus comprising:

storage means having a first management record storage area for storing a first management record used for management of image data and a second management record storage area for storing a second management record linked with the first management record; and acquisition means for acquiring an area for storing the first management record and the second management record in the storage means;

the apparatus managing the image data using the first management record and the second management record;

wherein the acquisition means acquires a storing area for storing the first management record in the second management record storage area, when the storing area for storing the first management record is not acquired in the first management record storage area.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

[Outline]

An MFP (Multi Function Peripheral) according to an embodiment of the present invention dynamically employs a memory area provided in a fixed size for the image management record (job management record, file management record, page management record, image block management block). And in registering each management record for a job that has occurred, if a storing area for the job management record is not secured in a job management record storing memory area, for example, the storing area for the job management record is assigned to other management record memory area. At this time, the memory area for each management record is assigned in a unit of size of management record mainly stored in the memory area. Thereby, it is possible to avoid a problem of fragmentation while utilizing the memory to the maximum.

[Apparatus Constitution]

Figure 1:
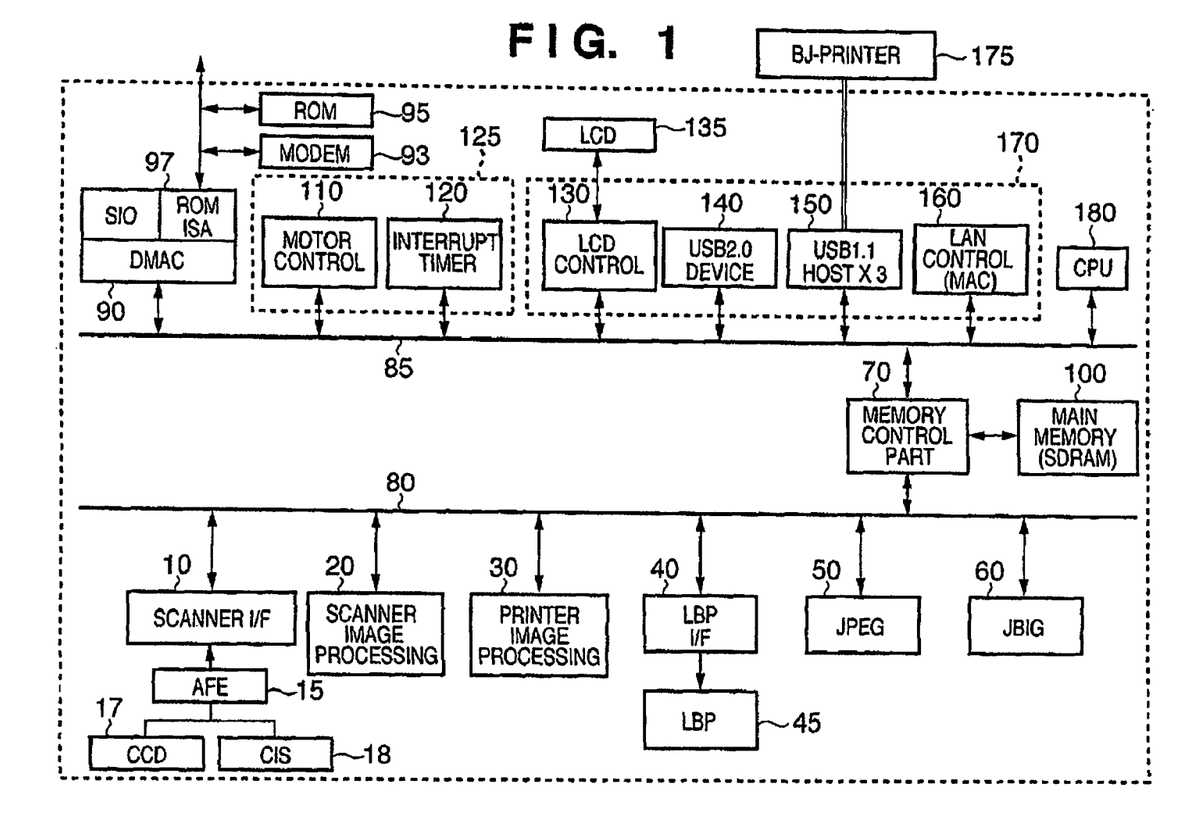
FIG. 1 is a schematic block diagram showing the hardware configuration of an MFP according to an embodiment of the present invention.

FIG. 1 is a block diagram showing the schematic configuration of an MFP (Multi Function Peripheral) 200 as an image processing apparatus according to the embodiment of the present invention. A CCD 17 and a CIS 18 are connected via an analog front end (AFE) 15 to a scanner interface part (hereinafter referred to as a "scanner I/F part") 10, whereby the read data is taken into the MFP 200 without interposing an individual dedicated circuit. The data processing of the scanner I/F part 10 will be described later.

Reference numeral 20 designates a scanner image processing part, which performs the image processing for the image data expanded on a main memory 100 through the processing of the scanner I/F part 10 in accordance with an image processing operation mode (color copy, monochrome copy, color scan, monochrome scan and so on).

A printer image processing part 30 is a processing unit for outputting the image data obtained as a result of image processing to the printer, and performs a process for outputting the image processing result via an LBP interface (I/F) 40 to a laser beam printer (LBP) 45 connected.

Reference numerals 50 and 60 designate the JPEG and JBIG modules which are processing parts for performs the compression and expansion process of image data in conformance with the predetermined standards.

Reference numeral 70 designates a memory control part, which is connected to a first BUS80 of an image processing system and a second BUS85 of a computer system to make the DMA (Direct Memory Access) control for writing and reading data into and from the main memory (SDRAM) 100.

Reference numeral 90 designates a DMA controller (DMAC) which makes the DNA control for the data transfer between each image processing part (10, 20, 30) and the main memory 100 in cooperation with the memory control part 70 by generating and setting the predetermined address information for the DMA control. For example, the address information for DMA transfer of the image data read and processed by the scanner I/F part 10 to the main memory 100 is generated for each channel of DMA, depending on the kind of image reading device, and whether CCD 17 or CIS 18, or the address information for reading the image data expanded on the main memory 100 is generated depending on the channel of DMA, and DMA transferred to the scanner image processing part 20. Thus, the DMA controller operates as a unit for governing the DMA control, together with the memory control part 70, between the main memory 100 and various interface parts (10, 40, 170) and the image processing parts (20, 30). The DMAC 90 is connected via a ROMISA 97 to a ROM 95, whereby the control parameters and the control program are appropriately set depending on the image reading device (CCD 17 or CIS 18). Since the control parameters are set differently, depending on the image reading device, an input process of the image data is enabled in accordance with an individual data output format of the CCD17 and CIS18, whereby it is unnecessary to provide the dedicated interface circuit.

Reference numeral 80 designates a first BUS that enables the data to be transferred between each processing part (10 to 60) of the image processing system, and reference numeral 85 designates a second BUS of the computer system to which a CPU 180, a communication and user interface control part 170, a mechatronics control part 125 and the DMAC 90 are connected.

The mechatronics control part 125 comprises a motor controller 110 and an interrupt timer controller 120 for governing the drive timing of a motor, and the timing control for controlling the tuning of the process in the image processing system.

An LCD control part 130 is a unit for governing the display control for displaying various settings and the processing status of the image processing apparatus on an LCD 135.

Reference numerals 140 and 150 designate the USB interfaces for enabling the connection to the peripheral devices. In FIG. 1, a BJ printer 175 is externally connected.

Reference numeral 160 designates a media access control (MAC) part, which is a unit for controlling the timing (access) at which data is sent to the connected device.

Reference numeral 180 designates a CPU for controlling the overall operation of the MFP 200.

FIGS. 2A to 2D are diagrams showing the organization of management records used to manage a job within the main memory 100 of the MFP 200.

Figure 2A:
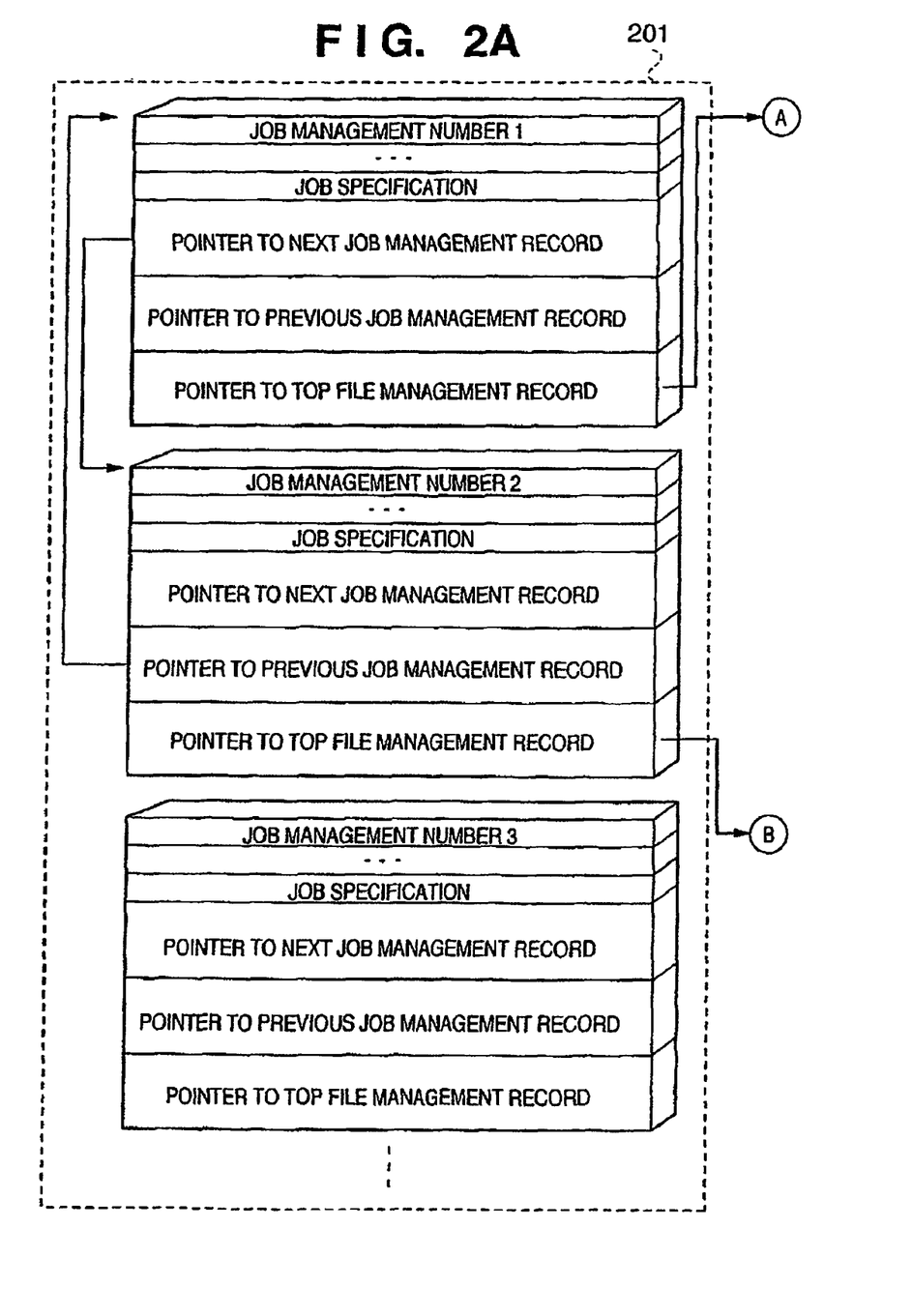
FIGS. 2A to 2D are diagrams showing an image management method performed on the MFP according to the embodiment of the invention.

In FIG. 2A, a block surrounded by the dotted line 201 represents the job management records. Each job management record stores the job specification such as copy, FAX or print, a pointer to the next job management record, a point to the previous job management record, and a pointer to the file management record of the top file of the files that the job has.

Figure 2B:
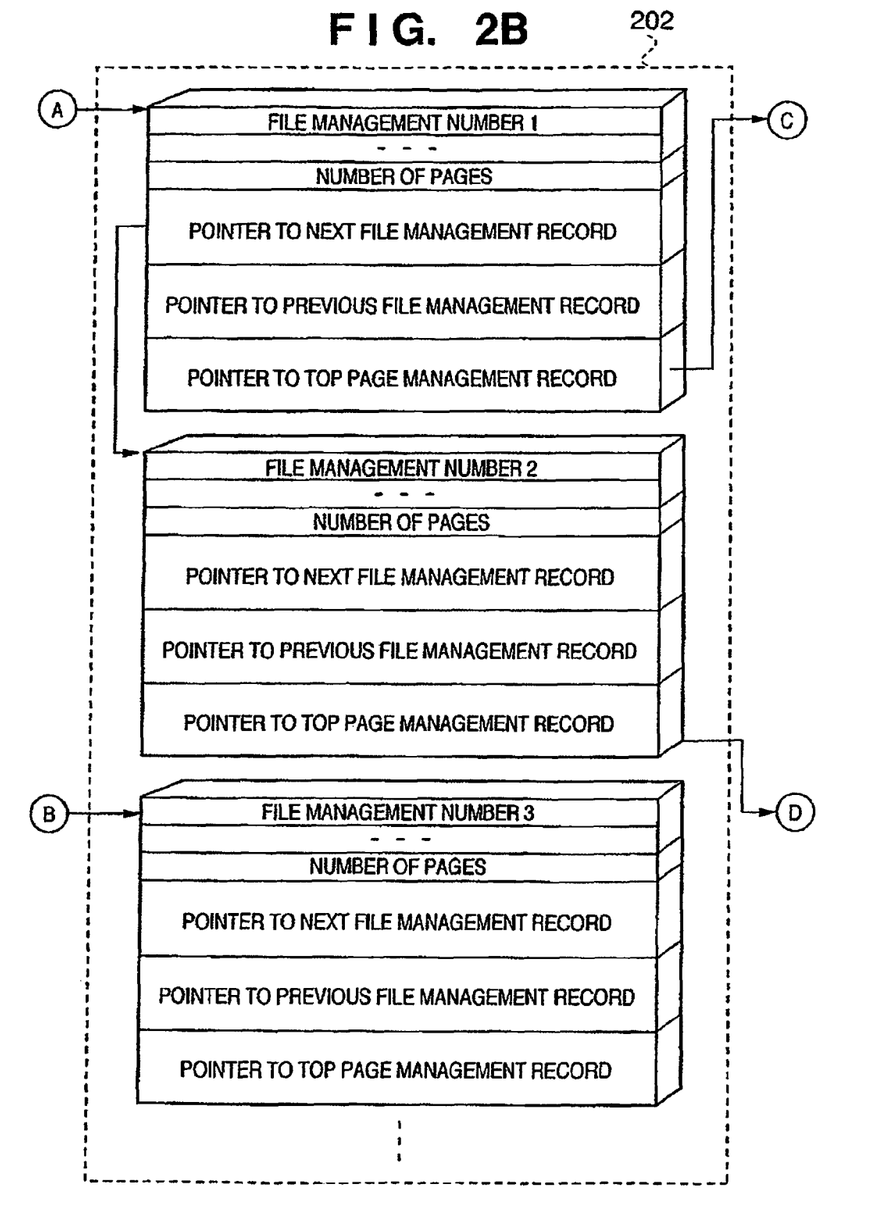

In FIG. 2B, a block surrounded by the dotted line 202 represents the file management records. Each file management record 202 stores a pointer to the next file management record, a point to the previous file management record, the number of pages managed by this file, and a pointer to the page management record of the top page of the pages managed by this file.

Figure 2C:
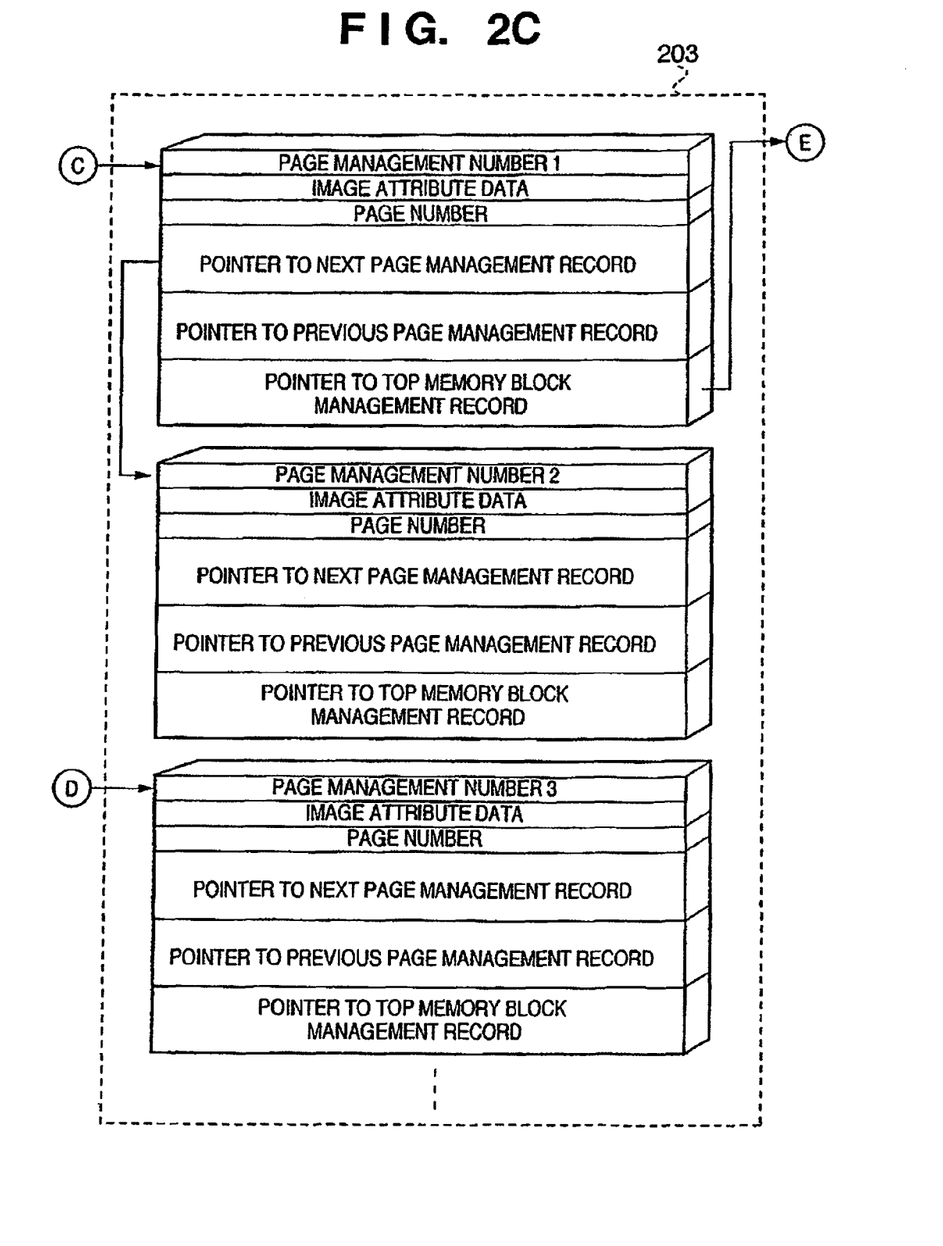

In FIG. 2C, a block surrounded by the dotted line 203 represents the page management records. Each page management record stores the page number in the file, image size, image attribute data such as coding method, a pointer to the next page management record, a point to the previous page management record, and a pointer to the memory block management record of the top memory block of the memory blocks managed by this page.

Figure 2D:
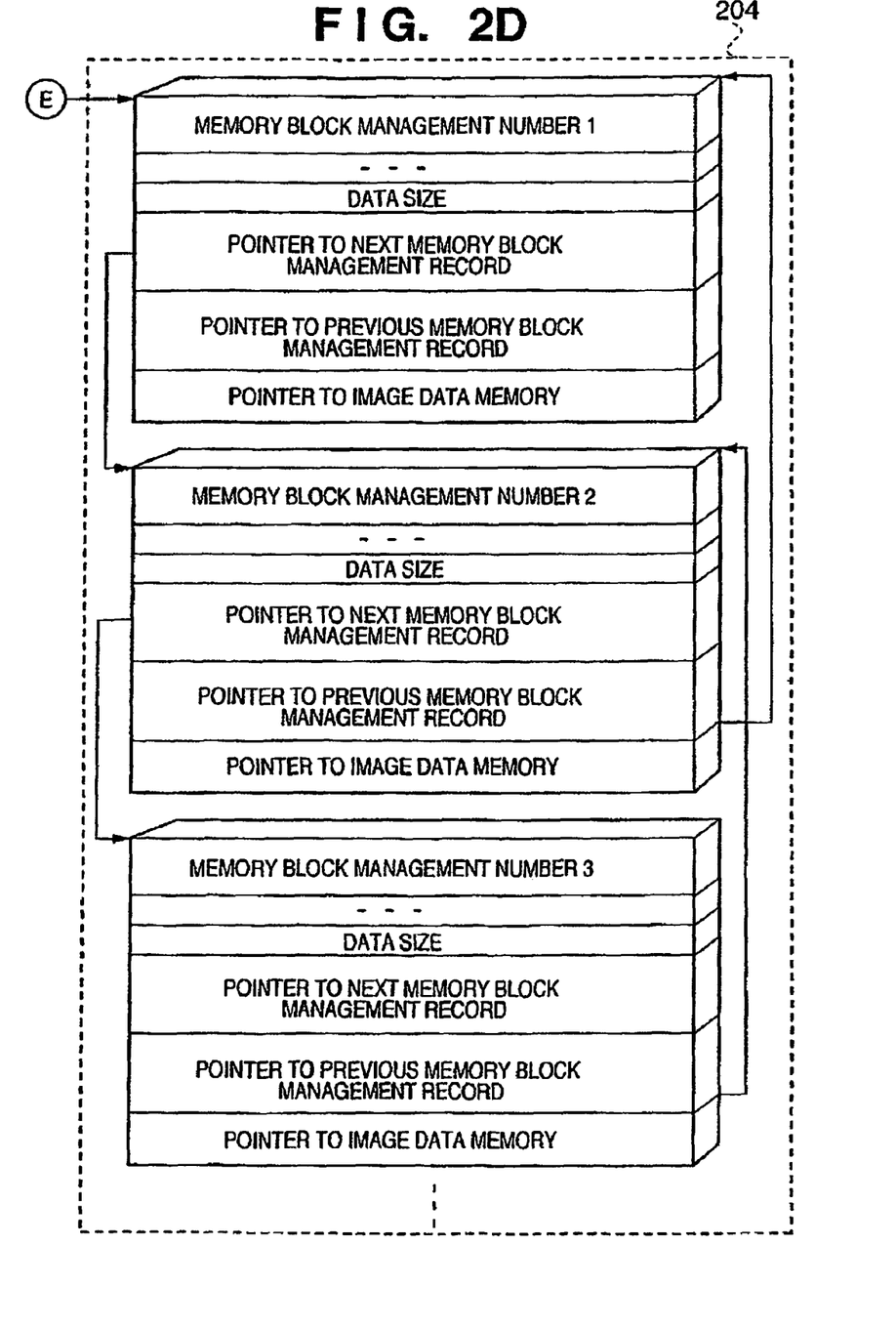

In FIG. 2D, a block surrounded by the dotted line 204 represents the memory block management records. Each memory block management record stores the memory block number in the page, a pointer to the next memory block management record, a point to the previous memory block management record, and the memory address at which the image data is stored. The image data is managed by a plurality of memory block management records.

In this manner, the image data is managed as a memory block, a plurality of memory blocks are managed as a page, a plurality of pages are managed as a file, and a plurality of files are managed as a job.

Figure 3:
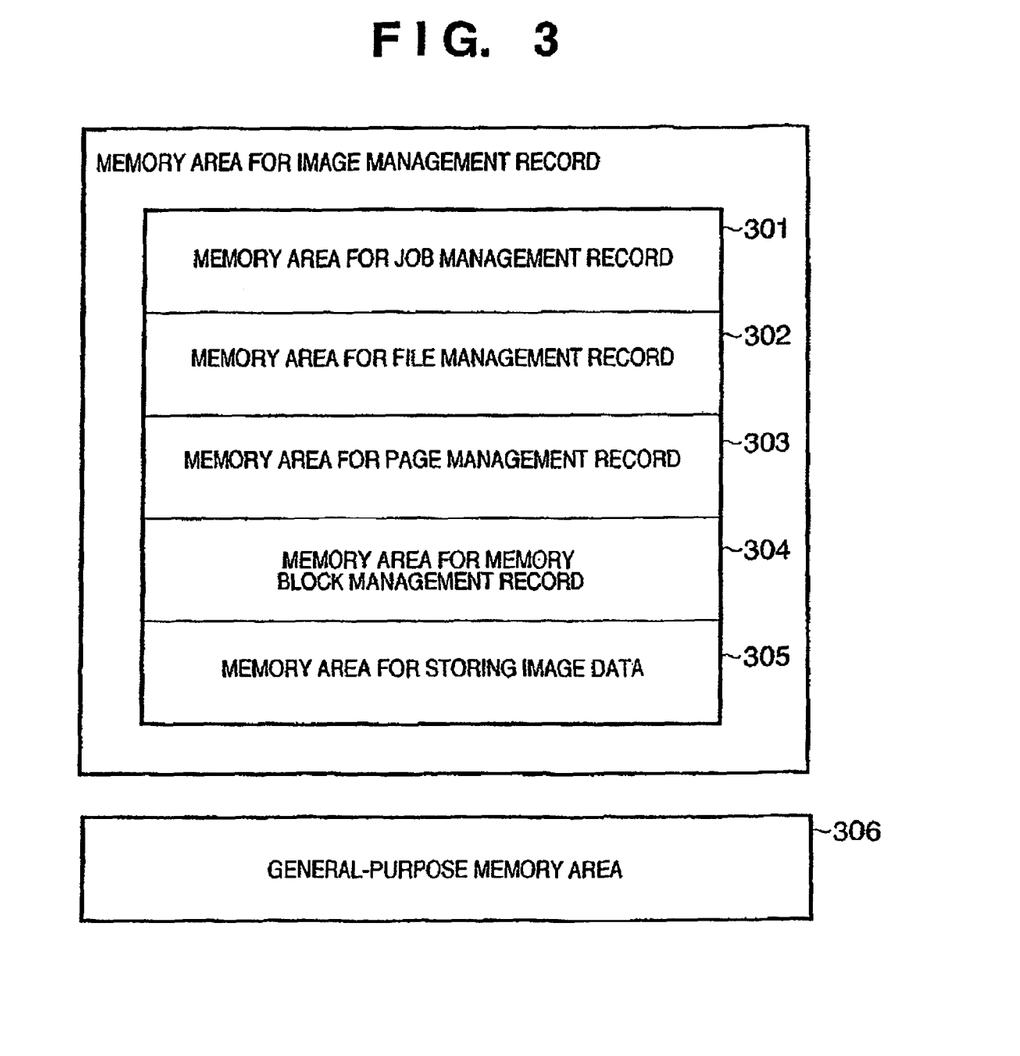
FIG. 3 is a typical diagram showing a memory area used as the management record.

FIG. 3 is a typical diagram showing a memory area for each management record for the image data as shown in FIGS. 2A to 2D.

In FIG. 3, reference numeral 301 designates a job management record memory area, 302 designates a file management record memory area, 303 designates a page management record memory area, 304 designates a memory block management record memory area, and 305 designates an image data storing memory area. In this manner, each management record is assigned each specific memory area in the memory. Moreover, reference numeral 306 designates a general-purpose memory area that is also employed other than the management record.

Figure 4:
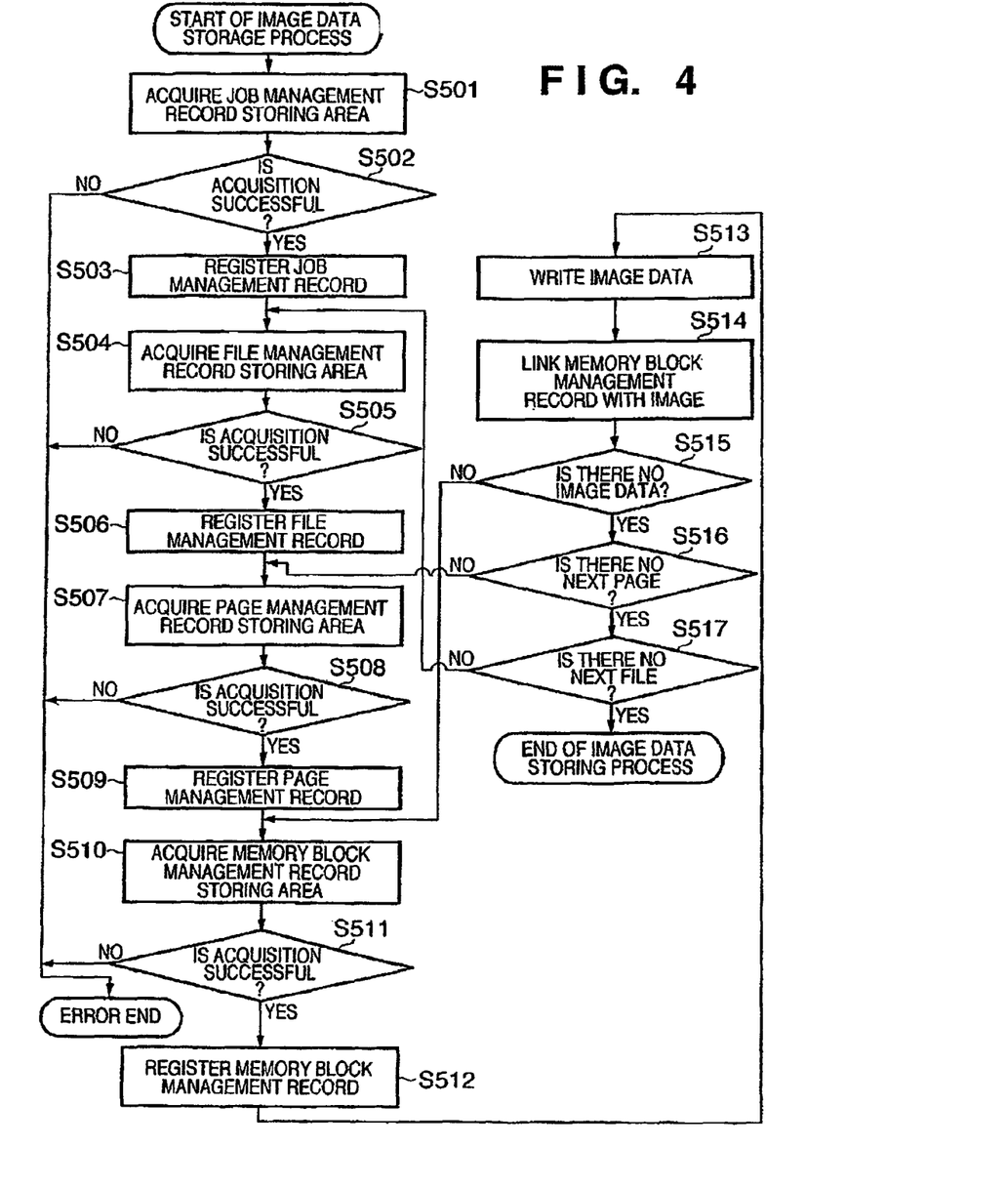
FIG. 4 is a flowchart of an image data management control.

FIG. 4 is a flowchart for an image data management control according to the invention.

When a job is accepted and the image data for the job is stored, a storing area for storing one job management record is firstly acquired at step S501. The detailed contents of this acquisition process herein will be described later with reference to FIG. 5.

Next, at step S502, the result at step S501 is checked. If the acquisition is successful, the procedure goes to step S503. If not, the procedure is ended and an error is returned.

At step S503, the information such as job specification is stored in the acquired storing area for job management record, and the procedure goes to step S504. At step S504, the storing area for storing one file management record is acquired. The detailed contents of this acquisition process herein will be described later with reference to FIG. 5.

Next, at step S505, the result at step S504 is checked. If the acquisition is successful, the procedure goes to step S506. If not, the procedure is ended and an error is returned. At step S506, the information such as file attribute is written in the acquired storing area for file management record. Moreover, if the file management record pertains to the top file of the job, a link to the top file management record is written into the storing area for job management record that is acquired at step S501. If the file management record does not pertain to the top file, a pointer to the previous file management record is written, and a pointer to the next file management record is written into the previous file management record.

Next, at step S507, a storing area for storing one page management record is acquired. The detailed contents of this acquisition process herein will be described later with reference to FIG. 5.

At step S508, the result at step S507 is checked. If the acquisition is successful, the procedure goes to step S509. If not, the procedure is ended and an error is returned.

At step S509, the information such as page attribute is written in the acquired storing area for page management record. Moreover, if the page management record pertains to the top page of the file, a link to the top page management record is written into the storing area for file management record that is acquired at step S504. If the page management record does not pertain to the top page, a pointer to the previous page management record is written, and a pointer to the next page management record is written into the previous page management record.

At step S510, a storing area for storing one memory block management record is acquired. The detailed contents of this acquisition process herein will be described later with reference to FIG. 5. At step S511, the result at step S510 is checked. If the acquisition is successful, the procedure goes to step S512. If not, the procedure is ended and an error is returned.

At step S512, if the memory block management record written herein is the memory block management record pertaining to the top memory block of the page, a link to the top memory block management record is written into the storing area for page management record that is acquired at step S507. If the memory block management record does not pertain to the top memory block, a pointer to the previous memory block management record is written, and a pointer to the next memory block management record is written into the previous memory block management record. And at step S513, all or part of the image data is written into an image data storing memory area 305. Then, the procedure goes to step S514. At step S514, a pointer to the image data storing memory area is written into the memory block management record. Then, the procedure goes to step S515.

At step S515, it is determined whether or not writing the image data contained in the page is ended. If ended, the procedure goes to step S516. If not ended, the procedure goes back to step S510. At step S516, it is determined whether or not the next page exists. If the next page does not exist, the procedure goes to step S517. If the next page exists, the procedure goes back to step S507. At step S517, it is determined whether or not the next file exists. If the next file does not exist, the image data storing process is ended, and the normal end is returned. If the next file exists, the procedure goes back to step S504.

Figure 5:
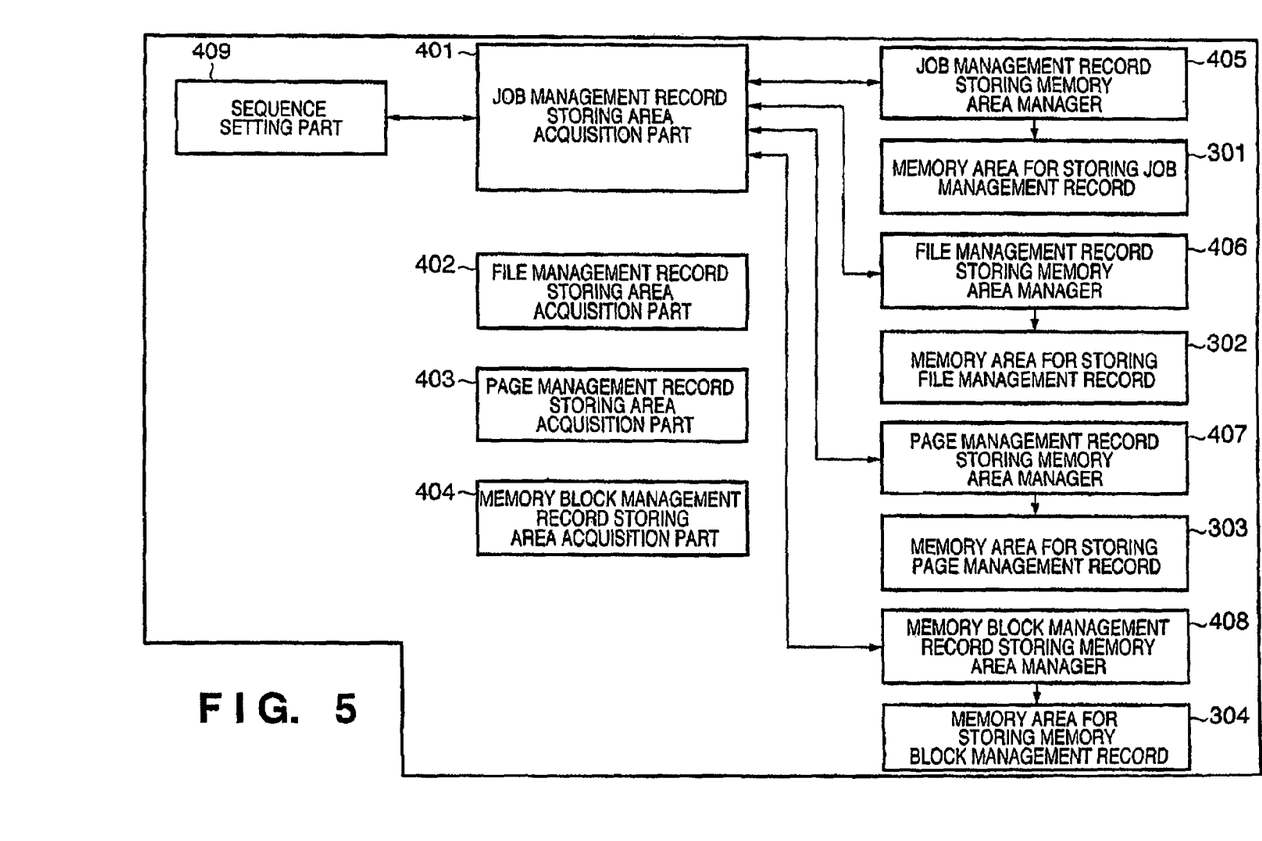
FIG. 5 is a block diagram showing a functional configuration of the MFP according to the embodiment of the invention.

FIG. 5 is a block diagram showing a functional configuration of the MFP 200.

The MFP 200 comprises, as the functional configuration, an acquisition part 401 for acquiring the storing area for job management record, an acquisition part 402 for acquiring the storing area for file management record, an acquisition part 403 for acquiring the storing area for page management record, and an acquisition part 404 for acquiring the storing area for memory block management record.

Also, the MFP 200 comprises a job management record storing memory area manager 405 for managing the job management record storing memory area 301, a file management record storing memory area manager 406 for managing the file management record storing memory area 302, a page management record storing memory area manager 407 for managing the page management record storing memory area 303, and a memory block management record storing memory area manager 408 for managing the memory block management record storing memory area 304.

Moreover, the MFP 200 comprises a setting part 409 for setting the sequence of memory area to be searched to acquire the storing area of each management record.

Each of the acquisition parts 401 to 404 can send an acquisition instruction with the size of memory area specified to acquire the storing area for storing the management record in each memory area to each of the managers 405 to 408.

Upon receiving an acquisition instruction from any of the acquisition parts 401 to 404, the managers 405 to 408 can secure the storing area as large as an integral multiple of the size of one management record, which is greater than or equal to the specified size and corresponds to the manager, in the memory area.

Each of the functional elements indicated by 401 to 409 implements its function by the CPU 180 performing a program module stored in the ROM 95.

The flow of a storing area acquisition process using this functional configuration will be described below. First of all, the process for acquiring the storing area for job management record, corresponding to step S501 of FIG. 4, will be described below.

When any job is accepted, the job management record storing area acquisition part 401 makes an inquiry to the job management record storing memory area manager 402 as to whether or not the storing area for storing the job management record for the job exists in the job management record storing memory area 301.

If the storing area for storing the job management record is secured in the job management record storing memory area 301, the storing area is secured, and the procedure goes to a record storing process. That is, the procedure goes to step S503 of FIG. 4.

On the other hand, if the storing area for storing the job management record is not left in the job management record storing memory area 301, the job management record storing memory area manager 405 notifies the job management record storing area acquisition part 401 that the storing area is not left. The job management record storing area acquisition part 401 once makes an inquiry to the sequence setting part 409 as to which of the memory areas 302 to 304 is searched next, to acquire the storing area in other memory areas.

If the sequence setting part 409 answers that the file management record storing memory area 302 is searched next, the job management record storing area acquisition part 401 makes an inquiry to the file management record storing memory area manager 406 as to whether or not the storing area for storing one job management record exists in the file management record storing memory area 302.

If the storing area for storing the job management record is secured in the file management record storing memory area 302, the storing area is secured, and the procedure goes to the record storing process (step S503 of FIG. 4). At this time, the file management record storing memory area manager 406 secures not the storing area of just one job management record but the storing area of n file management records (n is an integer of one or greater) including the storing area of one job management record in the file management record storing memory area 302. That is, in the file management record storing memory area 302, the area is acquired or released in a unit of size of the storing area for file management record.

On the other hand, if the storing area for storing the job management record is not left in the file management record storing memory area 302, the file management record storing memory area manager 406 notifies the job management record storing area acquisition part 401 that the storing area is not left. The job management record storing area acquisition part 401 once makes an inquiry to the sequence setting part 409 as to which of the memory areas 303 to 304 is searched next to acquire the storing area in other memory areas.

Similarly, it is determined whether or not the storing area for storing one job management record is acquired from the page management record storing memory area 303 or the memory block management record memory area 304, in due order, to acquire the storing area from any of the memory areas. In these cases, it is not the storing area itself of one job management record but the storing area of n page management records, or the storing area of n memory block management records (n is an integer of one or greater), including the storing area of one job management record, that is secured in the page management record storing memory area 303 or the memory block management record memory area 304. That is, in each of the management record storing memory areas 301 to 304, the area is acquired or released persistently in a unit of size of one management record to be stored therein.

If the storing area for storing one job management record is not secured in any memory area, a determination at step S502 of FIG. 4 is NO, and an error is returned.

Though the acquisition process (S501) of the storing area for job management record has been described above, the same operation may be performed for the acquisition process (S504) of the storing area for file management record, the acquisition process (S507) of the storing area for page management record and the acquisition process (S510) of the storing area for memory block management record. That is, first of all, an empty area is searched in a specific memory area. If the storing area is not secured therein, the storing area is secured in other memory areas. The sequence of referring to other memory areas is decided in the sequence setting part 409.

Herein, the sequence of acquiring the storing area for management record from the management record storing memory area will be described below. For example, four patterns are conceived as follows.

(1) Sequence of linking the management records. For example, because the job management record contains a pointer to the file management record, if the job management record storing memory area 301 is insufficient, the storing area is acquired from the file management record storing memory area 302. If the acquisition fails, the storing area for job management record is acquired in the sequence of the page management record storing memory area 303 and the memory block management record storing memory area 304.

(2) Sequence in which the usage ratio (occupancy ratio of used area as seen from the overall memory area) is smaller among the job management record memory area 301, the file management record memory area 302, the page management record memory area 303 and the memory block management record memory area 304.

(3) Sequence in which the total memory size is larger among the job management record memory area 301, the file management record memory area 302, the page management record memory area 303 and the memory block management record memory area 304.

(4) Sequence in which the amount of unallocated memory area is larger among the job management record memory area 301, the file management record memory area 302, the page management record memory area 303 and the memory block management record memory area 304.

Though not shown in FIG. 5, if the specific memory area is insufficient, the storing area for each management record may be secured in the image data storing memory area 305 or the general-purpose memory area 306 by checking the empty condition. In this case, the sequence setting part 409 decides from which of the memory areas including these memory areas 305 and 306 the storing area is secured in succession.

Figure 6A:
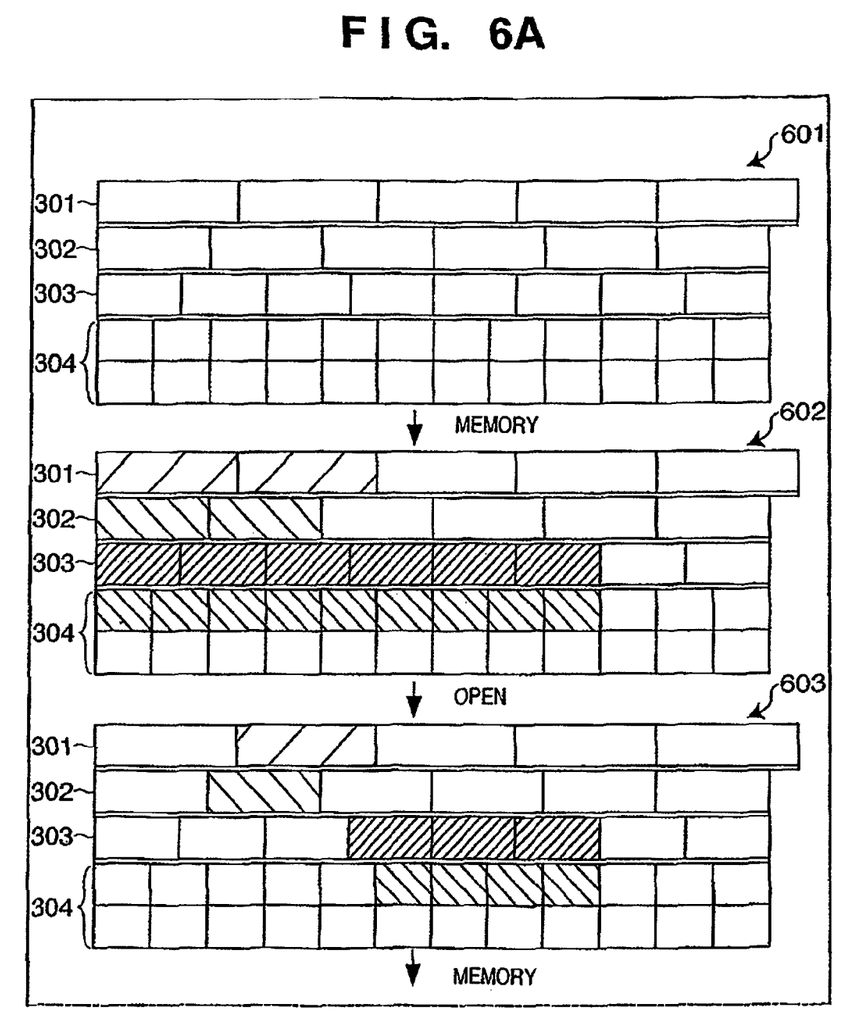
FIGS. 6A and 6B are diagrams for explaining the flow of storing the management record according to the embodiment of the invention.
Figure 6B:
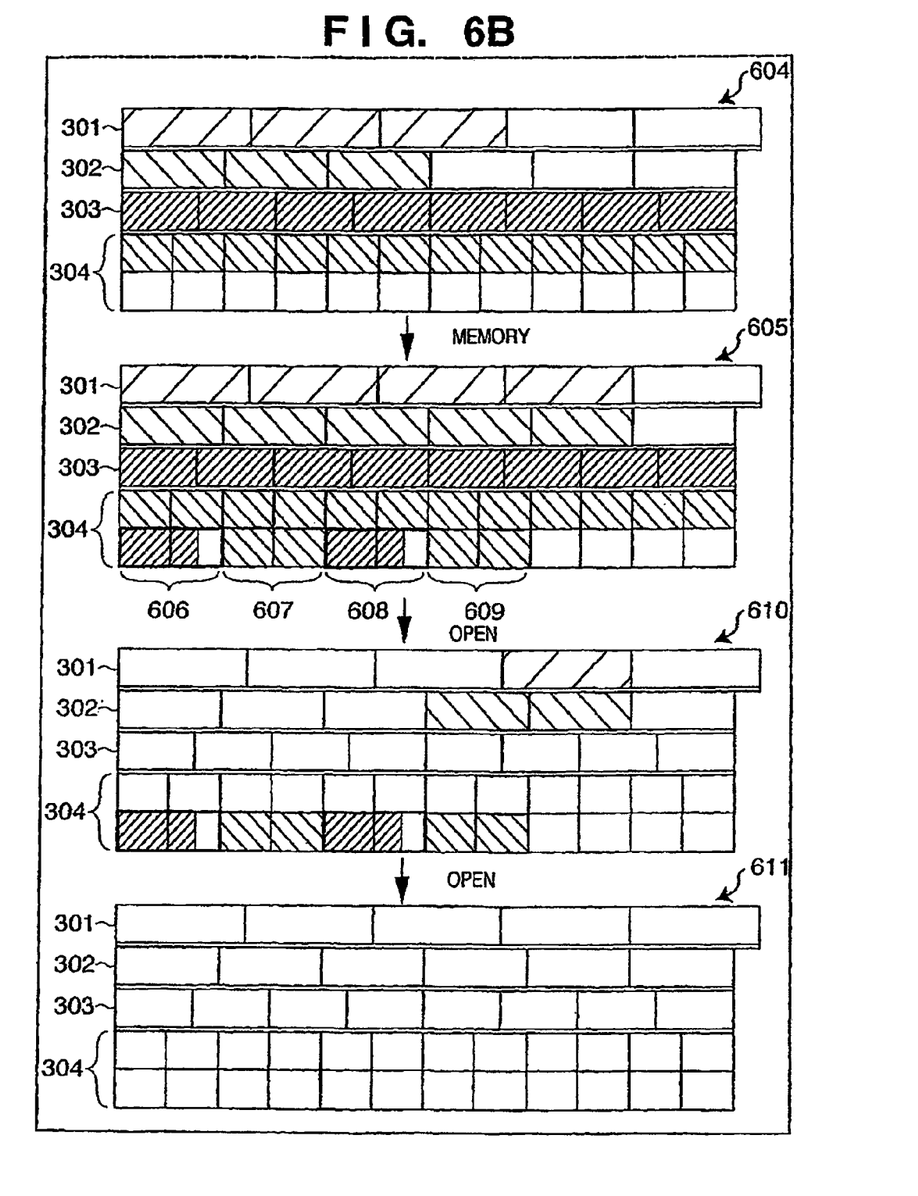

FIGS. 6A and 6B are diagrams for explaining how to employ the management record memory areas 301 to 304 in succession. The size ratio between the memory areas, the size ratio of one management record, and the number of management records stored are only exemplary.

The job management record, the file management record, the page management record and the memory block management record have different sizes of one unit. And each memory area has the size of an integral number of management records. In the normal use, the job management record is only stored in the job management record memory area 301, the file management record is only stored in the file management record memory area 302, the page management record is only stored in the page management record memory area 303, and the memory block management record is only stored in the memory block management record memory area 304. Therefore, each memory area may be partitioned in a unit of size of each management record as indicated at 401.

If two jobs occur from an empty state as indicated at 601 in FIG. 6A, the memory area for management record becomes a state as indicated at 602, for example. Then, if one job is executed to release the record, the memory area becomes a state as indicated at 603, for example. And if one job is newly stored, the memory area becomes a state as indicated at 604 in FIG. 6B, for example. The flow to this point is the same as before. In the state as indicated at 604, the memory area for page management record is full. Accordingly, if another job occurs, the storing area for storing the page management record is not secured in the memory area for page management record. Therefore, the conventional procedure was ended with an error at this time.

However, in this embodiment, the storing area for storing the page management record can be secured in the memory area for memory block management record as indicated at 605. In this case, the storing area as large as an integral multiple (twice in this figure) of the size of one memory block management record is secured. Accordingly, one page management record is stored in the area 606 of two memory block management records, and the memory block management record linked with the page management record is stored in the ensuing area 607. For the next page management record, one management record is stored in the area 608 of two memory block management records, and the memory block management record linked with the page management record is stored in the ensuing area 609.

Thereafter, if three jobs are executed, the memory area is released as indicated at 610. Further, if a job is executed, the memory area as indicated at 611 is released.

OTHER EMBODIMENTS

Though the embodiment of the present invention has been detailed above, the invention may be applied to a system constituted by a plurality of devices, or an apparatus comprising a single device.

Further, the invention can be implemented by supplying a software program, which implements the functions of the foregoing embodiments, directly or remotely to a system or apparatus, reading the supplied program code with a computer of the system or apparatus, and then executing the program code. Accordingly, since the functions of the present invention are implemented by computer, the program code installed in the computer is also included within a technical scope of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, an MO, a CD-ROM, a CD-R, a CD-RW, a magnetic tape, a non-volatile type memory card, a ROM, and a DVD (DVD-ROM and DVD-R).

As for the method of supplying the program, a client computer can be connected to a home page on the Internet using a browser of the client computer, and the computer program of the present invention or an automatically-installable compressed file of the program can be downloaded from the home page to a recording medium such as a hard disk. Further, the program of the present invention can be supplied by dividing the program code constituting the program into a plurality of files and downloading the files from different home pages. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a home page via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing according to the instructions of the program, so that the functions of the foregoing embodiments can be implemented by this processing.

Further, after the program read from the storage medium is written to a function expansion board inserted into the computer or to a memory provided in a function expansion unit connected to the computer, a CPU or the like mounted on the function expansion board or function expansion unit performs all or a part of the actual processing according to the instructions of the program, so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-177495 filed on Jun. 15, 2004, the entire contents of which are hereby incorporated by reference herein.

The invention claimed is: area.
1. An image processing apparatus comprising:
storage means having a first management record memory area which is capable of storing a plurality of first management records, each having a given size used for management of image data, and a second management record memory area which is capable of storing a plurality of second management records, each having a size that is different from the size of the first management record;
acquisition means for acquiring a storing area for storing a first management record in the first management record memory area and acquiring a storing area for storing a second management record in the second management record memory area; and
management means for managing the image data using the first management record and the second management record;
wherein when the storing area for storing the first management record cannot be acquired in the first management record memory area, the acquisition means acquires a storing area in the second management record memory area for storing the first management record as a size which is an integral multiple of the size of the second management record, even if a storage size is bigger than a storage size necessary for storing the first management record, and
wherein the management means stores the first management record having the given size in the storing area acquired as the size of the integral multiple of the second management record.

2. The image processing apparatus according to claim 1, wherein the storage means comprises a third management record memory that stores a third management record having a different size from the first management record and the second management record,
wherein the acquisition means acquires a storing area for storing the third management record in the third management record memory area,
wherein the management means manages image data by using the first management record, the second management record and the third management record.

3. The image processing apparatus according to claim 1, wherein when the acquisition means cannot acquire a storing area for storing the first management record in the first management record memory area, the acquisition means selects a management record memory area that has the smallest usage rate other than the first management record memory area, and acquires the storing area for storing the first management record as a size which is an integral multiple of the size of a management record corresponding to the selected management record memory area, and
wherein the management means stores the first management record having the given size in the acquired storing area as a size which is an integral multiple of the size of the management record corresponding to the selected management record memory area.

4. The image processing apparatus according to claim 1, wherein when the acquisition means cannot acquire a storing area for storing the first management record in the first management record memory area, the acquisition means selects a management record memory area that has the largest total memory size other than the first management record memory area, and acquires the storing area for storing the first management record as a size which is an integral multiple of the size of a management record corresponding to the selected management record memory area, and wherein the management means stores the first management record of a given size in the acquired storing area as a size which is an integral multiple of the size of the management record corresponding to the selected management record memory area.

5. The image processing apparatus according to claim 1, wherein when the acquisition means cannot acquire a storing area for storing the first management record in the first management record memory area, the acquisition means selects a management record memory area that has the largest amount of unallocated memory area other than the first management record memory area, and acquires the storing area for storing the first management record as a size which is an integral multiple of the size of a management record corresponding to the selected management record memory area, and wherein the management means stores the first management record having the given size in the acquired storing area as a size which is an integral multiple of the size of the management record corresponding to the selected management record memory area.

6. An image data management method comprising:

a storage step of having a first management record memory area which is capable of storing a plurality of first management records, each having a given size used for management of image data, and a second management record memory area which is capable of storing a plurality of second management records, each having a size that is different from the size of the first management record;

an acquisition step of acquiring a storing area for storing a first management record in the first management record memory and acquiring a storing area for storing a second management record in the second management record memory area; and a management step of managing the image data using the first management record and the second management record;

wherein when the storing area for storing the first management record cannot be acquired in the first management record memory area, the acquisition step acquires a storing area in the second management record memory area for storing the first management record as a size which is an integral multiple of the size of the second management record, even if a storage size is bigger than a storage size necessary for storing the first management record, and wherein the management step stores the first management record having the given size in the storing area acquired as the size of the integral multiple of the second management record.

7. The image data management method according to claim 6, wherein the storage step comprises a third management record memory that stores a third management record having a different size from the first management record and the second management record, wherein the acquisition step acquires a storing area for storing the third management record in the third management record memory area, wherein the management step manages image data by using the first management record, the second management record and the third management record.

8. The image data management method according to claim 6, wherein when the acquisition step cannot acquire a storing area for storing the first management record in the first management record memory area, the acquisition step selects a management record memory area that has the smallest usage rate other than the first management record memory area, and acquires the storing area for storing the first management record as a size which is an integral multiple of the size of a management record corresponding to the selected management record memory area, and wherein the management step stores the first management record having the given size in the acquired storing area as a size which is an integral multiple of the size of the management record corresponding to the selected management record memory area.

9. The image data management method according to claim 6, wherein when the acquisition step cannot acquire a storing area for storing the first management record in the first management record memory area, the acquisition step selects a management record memory area that has the largest total memory size other than the first management record memory area, and acquires the storing area for storing the first management record as a size which is an integral multiple of the size of a management record corresponding to the selected management record memory area, and wherein the management step stores the first management record having the given size in the acquired storing area as a size which is an integral multiple of the size of the management record corresponding to the selected management record memory area.

10. The image data management method according to claim 6, wherein when the acquisition step cannot acquire a storing area for storing the first management record in the first management record memory area, the acquisition step selects a management record memory area that has the largest amount of unallocated memory area other than the first management record memory area, and acquires the storing area for storing the first management record as a size which is an integral multiple of the size of management record corresponding to the selected management record memory area, and wherein the management step stores the first management record having the given size in the acquired storing area as a size which is an integral multiple of the size of the management record corresponding to the selected management record memory area.

11. A non-transitory computer-readable storage medium storing a computer-executable program for causing a computer to perform an image data management method, the method comprising:

a storage step of having a first management record memory area which is capable of storing a plurality of first management records, each having a given size used for management of image data, and a second management record memory area which is capable of storing a plurality of second management records, each having a size that is different from the size of the first management record;

an acquisition step of acquiring a storing area for storing a first management record in the first management record memory and acquiring a storing area for storing a second management record in the second management record memory area; and a management step of managing the image data using the first management record and the second management record;

wherein when the storing area for storing the first management record cannot be acquired in the first management record memory area, the acquisition step acquires a storing area in the second management record memory area for storing the first management record as a size which is an integral multiple of the size of the second management record, even if a storage size is bigger than a storage size necessary for storing the first management record, and wherein the management step stores the first management record having the given size in the storing area acquired as the size of the integral multiple of the second management record.

* * * * *